US010287384B2

(12) United States Patent
Garcia Castro et al.

(10) Patent No.: US 10,287,384 B2
(45) Date of Patent: *May 14, 2019

(54) POLYMERIC COMPOSITIONS AS POUR POINT DEPRESSANTS FOR CRUDE OILS

(71) Applicant: BASF SE, Ludwigshafen (DE)

(72) Inventors: Ivette Garcia Castro, Ludwigshafen (DE); Kai Gumlich, Köln (DE); Stefan Frenzel, Eislingen (DE); Maria Heuken, Mannheim (DE); Rouven Konrad, Mörstadt (DE); Karin Neubecker, Frankenthal (DE)

(73) Assignee: BASF SE (DE)

( * ) Notice: Subject to any disclaimer, the term of this patent is extended or adjusted under 35 U.S.C. 154(b) by 203 days.

This patent is subject to a terminal disclaimer.

(21) Appl. No.: 14/856,646

(22) Filed: Sep. 17, 2015

(65) Prior Publication Data

US 2016/0032200 A1   Feb. 4, 2016

Related U.S. Application Data

(62) Division of application No. 14/108,488, filed on Dec. 17, 2013, now Pat. No. 9,574,146.

(60) Provisional application No. 61/738,415, filed on Dec. 18, 2012.

(51) Int. Cl.
| | | |
|---|---|---|
| *C10G 71/00* | (2006.01) |
| *C10L 10/16* | (2006.01) |
| *C10M 145/14* | (2006.01) |
| *C08F 255/02* | (2006.01) |
| *C09K 8/524* | (2006.01) |
| *C10M 159/00* | (2006.01) |
| *C08F 220/18* | (2006.01) |

(52) U.S. Cl.
CPC ........ *C08F 255/026* (2013.01); *C08F 220/18* (2013.01); *C09K 8/524* (2013.01); *C10G 71/00* (2013.01); *C10L 10/16* (2013.01); *C10M 145/14* (2013.01); *C10M 159/005* (2013.01); *C10L 2200/0438* (2013.01); *C10L 2230/14* (2013.01); *C10L 2250/04* (2013.01); *C10M 2203/1006* (2013.01); *C10M 2205/022* (2013.01); *C10M 2209/084* (2013.01); *C10N 2230/02* (2013.01)

(58) Field of Classification Search
CPC ............... C08F 220/18; C08F 255/026; C08F 2220/1891; C08F 2220/1808; C10M 159/005; C10M 145/14; C10M 2209/084; C10M 2205/022; C10L 2230/14; C10L 2250/04; C10L 2200/0438; C10N 2230/02
See application file for complete search history.

(56) References Cited

U.S. PATENT DOCUMENTS

| | | | |
|---|---|---|---|
| 3,596,437 A * | 8/1971 | Styring, Jr. ............... F17D 1/16 137/13 |
| 3,911,053 A | 10/1975 | Wiest et al. |
| 4,104,329 A | 8/1978 | Abdou-Sabet et al. |
| 4,329,267 A | 5/1982 | Riebel et al. |
| 4,608,411 A | 8/1986 | Meunier et al. |
| 4,906,682 A * | 3/1990 | Mueller .................. C08L 23/08 524/458 |
| 4,932,980 A | 6/1990 | Mueller et al. |
| 5,312,884 A | 5/1994 | Gore et al. |
| 7,001,903 B2 | 2/2006 | Andersch et al. |
| 9,574,146 B2 * | 2/2017 | Garcia Castro ......... C10L 10/16 |
| 2006/0137242 A1 | 6/2006 | Siggelkow et al. |
| 2007/0161755 A1 | 7/2007 | Siggelkow et al. |
| 2007/0213231 A1 | 9/2007 | Jennings |
| 2012/0304532 A1 | 12/2012 | Krull et al. |
| 2014/0166286 A1 | 6/2014 | Nguyen et al. |
| 2014/0166287 A1 | 6/2014 | Faul et al. |

FOREIGN PATENT DOCUMENTS

| | | |
|---|---|---|
| CA | 980117 A1 | 12/1975 |
| CA | 2008986 A1 | 8/1990 |
| CA | 2055418 A1 | 5/1992 |
| CN | 102559302 A | 7/2012 |
| DE | 1645785 A1 | 8/1969 |
| DE | 2047448 A1 | 3/1972 |
| DE | 2102469 A1 | 8/1972 |
| EP | 84148 A2 | 7/1983 |
| EP | 486836 A1 | 5/1992 |
| EP | 1674554 A1 | 6/2006 |
| EP | 1808450 A1 | 7/2007 |
| EP | 2305753 A1 | 4/2011 |
| GB | 1368159 A | 9/1974 |
| WO | WO-1991018182 A1 | 11/1991 |
| WO | WO-2011035947 A1 | 3/2011 |
| WO | WO-2011076337 A2 | 6/2011 |

OTHER PUBLICATIONS

Isodecanol product sheet downloaded from http://www.chembk.com/en/chem/Isodecanol Jun. 23, 2017.*

(Continued)

*Primary Examiner* — Irina S Zemel
*Assistant Examiner* — Jeffrey S Lenihan
(74) *Attorney, Agent, or Firm* — Drinker Biddle & Reath LLP

(57) ABSTRACT

Polymeric compositions obtainable by free-radical polymerization of at least two different alkyl (meth)acrylates in the presence of at least one ethylene-vinyl ester copolymer, the alkyl (meth)acrylates used being a mixture comprising alkyl (meth)acrylates having linear $C_{12}$- to $C_{60}$-alkyl radicals and different alkyl (meth)acrylates having linear $C_1$- to $C_{11}$-alkyl radicals and/or branched $C_4$- to $C_{60}$-alkyl radicals and/or cyclic $C_5$- to $C_{20}$-alkyl radicals. The use of such polymeric compositions as pour point depressants for crude oils, mineral oils or mineral oil products.

20 Claims, No Drawings

(56) References Cited

OTHER PUBLICATIONS

GCC Office Action for Application No. GC 2013-26007, dated Apr. 10, 2017.
International Search Report for Application No. PCT/EP2013075742, dated Feb. 24, 2014.
International Search Report (German) for PCT/EP2013/075746, dated Feb. 26, 2014.
Zhang, C., "Diesel pour point depressant, useful in petroleum refining, transportation and storage applications, comprises ethylene-vinyl acetate co-polymer, styrene-maleic acid octadecyl alkyl ester, polymethacrylate, and non-ionic surfactant", Database WPI Week 201302, Thomson Scientific, XP-002720254, (2012).

* cited by examiner

POLYMERIC COMPOSITIONS AS POUR POINT DEPRESSANTS FOR CRUDE OILS

CROSS-REFERENCE TO RELATED APPLICATIONS

This application is a divisional application, and claims benefit under 35 U.S.C. § 120, of U.S. application Ser. No. 14/108,488, filed Dec. 17, 2013, which in turn claims benefit under 35 USC 119(e) of U.S. Provisional Application Ser. No. 61/738,415, filed Dec. 18, 2012, the applications of which are incorporated herein by reference in their entirety.

The present invention relates to polymeric compositions obtainable by free-radical polymerization of at least two different alkyl (meth)acrylates in the presence of at least one ethylene-vinyl ester copolymer, the alkyl (meth)acrylates used being a mixture comprising alkyl (meth)acrylates having linear $C_{12}$- to $C_{60}$-alkyl radicals and different alkyl (meth)acrylates having linear $C_1$- to $C_{11}$-alkyl radicals and/or branched $C_4$- to $C_{60}$-alkyl radicals and/or cyclic $C_5$- to $C_{20}$-alkyl radicals. The invention further relates to the use of such polymeric compositions as pour point depressants for crude oils, mineral oils or mineral oil products.

BACKGROUND OF THE INVENTION

Underground mineral oil formations typically have relatively high temperatures. After the production of the crude oil to the surface, the crude oil produced therefore cools down to a greater or lesser degree according to the production temperature and the storage or transport conditions.

According to their origin, crude oils have different proportions of waxes, which consist essentially of long-chain n-paraffins. According to the type of crude oil, the proportion of such paraffins may typically be 1 to 30% by weight of the crude oil. When the temperature goes below a particular level in the course of cooling, the paraffins can crystallize, typically in the form of platelets. The precipitated paraffins considerably impair the flowability of the oil. The platelet-shaped n-paraffin crystals can form a kind of house-of-cards structure which encloses the crude oil, such that the crude oil ceases to flow, even though the predominant portion is still liquid. The lowest temperature at which a sample of an oil still just flows in the course of cooling is referred to as the pour point ("yield point"). For the measurement of the pour point, standardized test methods are used. Precipitated paraffins can block filters, pumps, pipelines and other installations or be deposited in tanks, thus entailing a high level of cleaning.

The deposit temperature of oil deposits is generally above room temperature, for example 40° C. to 100° C. Crude oil is produced from such deposits while still warm, and it naturally cools more or less quickly to room temperature in the course of or after production, or else to lower temperatures under corresponding climatic conditions. Crude oils may have pour points above room temperature, such that crude oils of this kind may solidify in the course of or after production.

It is known that the pour point of crude oils can be lowered by suitable additives. This can prevent paraffins from precipitating in the course of cooling of produced crude oil. Suitable additives firstly prevent the formation of said house-of-cards-like structures and thus lower the temperature at which the crude oil solidifies. In addition, additives can promote the formation of fine, well-crystallized, non-agglomerating paraffin crystals, such that undisrupted oil transport is ensured. Such additives are also referred to as pour point depressants or flow improvers.

Paraffin inhibitors or wax inhibitors refer to those substances intended to prevent the deposition of paraffins or paraffin waxes on surfaces in contact with crude oils or other wax-containing oils and/or mineral oil products.

The use of ethylene copolymers as flow improvers is known, especially that of copolymers of ethylene and unsaturated esters. Examples thereof are described in DE-A-21 02 469 or EP 84 148 A2.

DE-A-16 45 785 discloses heating oil mixtures with a depressed pour point. The mixtures comprise at least 3% by weight of polymers having unbranched saturated side chains having at least 18 carbon atoms, for example homo- or copolymers of alkyl esters of unsaturated mono- and dicarboxylic acids and homo- or copolymers of various alkyl vinyl ethers.

DE-A-20 47 448 discloses additives for lowering viscosity in paraffin-based crude oils. The additives are mixtures of polyvinyl ethers and ethylene-vinyl acetate copolymers.

EP 486 836 A1 discloses mineral oil middle distillates, for example gas oils, diesel oils or heating oil, which comprise polymeric additives to improve the flow properties under cold conditions. The polymeric additives are a combination of customary ethylene-based flow improvers, for example copolymers of ethylene and vinyl acetate, vinyl propionate or ethylhexyl acrylate and copolymers of linear or branched $C_8$- to $C_{18}$-alkyl (meth)acrylates and/or linear or branched $C_{18}$- to $C_{28}$-alkyl vinyl ethers in a weight ratio of 40:60 to 95:5, and the copolymers of the alkyl (meth)acrylates and/or alkyl vinyl ethers and the conventional flow improvers may be in the form of a mixture or the copolymers of the alkyl (meth)acrylates and/or alkyl vinyl ethers may wholly or partly be grafted onto the conventional flow improvers. The alkyl radicals are preferably unbranched, but up to 20% by weight of cyclic and/or branched moieties may be present. In the sole example for preparation of a graft copolymer, n-dodecyl acrylate and n-octadecyl vinyl ether are grafted onto a copolymer of ethylene and vinyl propionate having a mean molar mass $M_n$ of approx. 2500 g/mol. The solvent used for the preparation is isoundecane, and aromatic solvents are used at a later stage for dilution.

U.S. Pat. No. 4,608,411 discloses graft copolymers for prevention of wax deposition from crude oils. The main chain consists of a copolymer of ethylene and a monomer selected from the group of vinyl esters of $C_2$- to $C_{18}$-monocarboxylic acids, $C_1$- to $C_{12}$-esters of unsaturated monocarboxylic acids or unsaturated α,β-dicarboxylic acids, or the esters or anhydrides thereof. Onto this are grafted homo- or copolymers of alkyl acrylates, the alkyl group thereof having at least 12 carbon atoms and at least 20% of the alkyl groups having at least 22 carbon atoms. The solvents proposed are various hydrocarbons.

Such graft copolymers for use as pour point depressants are typically prepared in chemical production sites, and the products are transported from there to the site of use, for example to an oilfield or to an offshore platform. Such sites of use may be in cold regions of the Earth. In order to save transport costs, concentrates of the graft copolymers in hydrocarbons are typically produced, for example concentrates having a polymer content of 50 to 80% by weight of polymers. Such concentrates can be used as such or can be formulated by users on site in the desired manner to give ready-to-use formulations. For example, dilution with solvent and/or addition of further additives is possible.

Particularly advantageous pour point depressants can be obtained by preparing said graft copolymers based on ethylene-vinyl ester copolymers using alkyl (meth)acrylates having $C_{18}$ to $C_{22}$ carbon radicals. Such products, however, have the disadvantage that the solutions thereof in hydrocarbons, especially the concentrates mentioned, can solidify in the course of cooling to room temperature. They accordingly first have to be melted for use, which means additional work for the user.

SUMMARY OF THE INVENTION

It is therefore an object of the present invention to provide improved pour point depressants for crude oils, and these should be obtainable—analogously to the known products—by free-radical polymerization of alkyl (meth)acrylates in the presence of ethylene-vinyl ester copolymers. The improved products should have the same influence on the pour point as the known products. However, they should also be liquid in concentrated solution in hydrocarbons, and it should thus be possible to add them to crude oils in a simple manner.

Accordingly, polymeric compositions obtainable by free-radical polymerization of monoethylenically unsaturated monomers (A) in the presence of at least one ethylene-vinyl ester copolymer (B) have been found, the monomers (A) comprising at least 70% by weight of alkyl (meth)acrylates (A1) based on the amount of all monomers (A), the ethylene-vinyl ester copolymers (B) comprising 55 to 85% by weight of ethylene and 15 to 45% by weight of vinyl esters of the general formula $H_2C=CH-O-(O)C-R^1$ (III) where $R^1$ is H or a $C_1$- to $C_4$ hydrocarbyl radical, and the amount of the monomers (A) being 70 to 90% by weight and that of the ethylene-vinyl ester copolymers (B) 10 to 30% by weight based on the sum of the monomers (A) and the ethylene-vinyl ester copolymers (B) together, and the alkyl (meth)acrylates (A1) being a mixture of (A1a) 50 to 99 mol % of at least one alkyl (meth)acrylate (A1a) of the general formula $H_2C=C(R^2)-COOR^3$ where $R^2$ is H or a methyl group and $R^3$ is a linear alkyl radical having 12 to 60 carbon atoms, and (A1b) 1 to 49 mol % of at least one alkyl (meth)acrylate (A1b) of the general formula $H_2C=C(R^2)-COOR^4$ where $R^2$ is as already defined and $R^4$ is a saturated aliphatic hydrocarbyl radical selected from the group of $R^{4a}$, $R^{4b}$ and $R^{4c}$ radicals and the radicals are each defined as follows:

$R^{4a}$: linear alkyl radicals having 1 to 11 carbon atoms, $R^{4b}$: branched alkyl radicals having 4 to 60 carbon atoms, and $R^{4c}$: cyclic alkyl radicals having 5 to 20 carbon atoms, with the proviso that the sum of the amounts of (A1a) and (A1b) adds up to 100 mol %.

In a preferred embodiment of the invention, the polymeric composition further comprises hydrocarbons as solvents, more preferably hydrocarbons having a flashpoint ≥60° C.

In a further aspect of the invention, the use of the said polymeric composition, preferably dissolved in hydrocarbons, as a pour point depressant for crude oil, mineral oil and/or mineral oil products has been found, by adding at least one polymeric composition of said type to the crude oil, mineral oil and/or mineral oil products.

DETAILED DESCRIPTION OF THE INVENTION

Specific details of the invention are as follows:

Starting Materials Used

Monomers (A)

The monomers (A) used are monoethylenically unsaturated monomers, with the proviso that at least 70% by weight of the monomers (A) are alkyl (meth)acrylates (A1). According to the invention, the alkyl (meth)acrylates (A1) are a mixture of at least one alkyl (meth)acrylate (A1a) and at least one alkyl (meth)acrylate (A1b).

Alkyl (Meth)Acrylates (A1)

Alkyl (Meth)Acrylates (A1a)

The alkyl (meth)acrylates (A1a) have the general formula $H_2C=C(R^2)-COOR^3$ where $R^2$ is H or a methyl group and $R^3$ is a linear alkyl radical having 12 to 60 carbon atoms, preferably 16 to 30 carbon atoms, more preferably 18 to 24 carbon atoms and, for example, 18 to 22 carbon atoms. $R^3$ may be a 1-hexadecyl radical, 1-octadecyl radical, 1-nonadecyl radical, 1-eicosyl radical, 1-heneicosyl radical, 1-docosyl radical, 1-tetracosyl radical, 1-hexacosyl radical, 1-octacosyl radical or 1-triacontyl radical. It will be appreciated that it is also possible to use a mixture of various alkyl (meth)acrylates (A1a). For example, it is possible to use mixtures in which $R^3$ represents $C_{16}$ and $C_{18}$ radicals or $C_{18}$, $C_{20}$ and $C_{22}$ radicals.

In a preferred embodiment, at least one of the alkyl (meth)acrylates (A1a) used is 1-docosyl (meth)acrylate (behenyl acrylate), i.e. $R^3$ is a linear alkyl radical having 22 carbon atoms. In a particularly preferred embodiment of the invention, at least 40% by weight of the alkyl (meth)acrylates (A1a) used is 1-docosyl (meth)acrylate. Advantageously, it is possible to use mixtures comprising 1-octadecyl (meth)acrylate, 1-eicosyl (meth)methacrylate and 1-docosyl (meth)acrylate. Such mixtures of various (meth)acrylates are also commercially available. As well as the $C_{18}/C_{20}/C_{22}$ (meth)acrylates mentioned, they may also comprise small amounts of (meth)acrylates with a higher or lower carbon number as by-products. For example, mixtures may comprise 40 to 55% by weight of 1-octadecyl (meth)acrylate, 10 to 15% by weight of 1-eicosyl (meth)methacrylate and 35 to 45% by weight of 1-docosyl (meth)acrylate.

Alkyl (Meth)Acrylates (A1b)

The alkyl (meth)acrylates (A1b) have the general formula $H_2C=C(R^2)-COOR^4$ where $R^2$ is as already defined and $R^4$ is a saturated aliphatic hydrocarbyl radical selected from the group of $R^{4a}$, $R^{4b}$ and $R^{4c}$ radicals and the radicals are each defined as follows:

$R^{4a}$: linear alkyl radicals having 1 to 11, preferably 2 to 10 and more preferably 2 to 6 carbon atoms, $R^{4b}$: branched alkyl radicals having 4 to 60, preferably 4 to 30, more preferably 4 to 17, carbon atoms, and $R^{4c}$: cyclic alkyl radicals having 5 to 20, preferably 6 to 12, more preferably 6 to 10 and, for example, 10 carbon atoms.

Examples of linear alkyl radicals $R^{4a}$ comprise ethyl, n-propyl, n-butyl, n-pentyl, n-hexyl, n-heptyl, n-octyl, n-nonyl, n-decyl and n-undecyl radicals, preference being given to n-propyl, n-butyl, n-pentyl, n-hexyl, n-heptyl, n-octyl, n-nonyl and n-decyl radicals, particular preference to ethyl, n-propyl, n-butyl, n-pentyl and n-hexyl radicals and very particular preference to n-butyl radicals.

Branched alkyl radicals $R^{4b}$ may be singly or multiply branched. Examples of branched radicals $R^{4b}$ comprise i-butyl, t-butyl, 2,2'-dimethylpropyl, 2-ethylhexyl, 2-propylheptyl, i-nonanol, i-decyl, i-tridecyl, i-heptadecyl radicals, preference being given to t-butyl, 2-ethylhexyl and 2-propylheptyl radicals.

Cyclic alkyl radicals may $R^{4c}$ may be monocyclic or polycyclic, especially bicyclic. They may additionally be substituted by linear and/or branched alkyl radicals. Examples of cyclic alkyl radicals $R^{4c}$ comprise cyclopentyl, cyclohexyl, 4-methylcyclohexyl, cycloheptyl, bicyclo[2.2.1]heptyl, bicyclo[2.2.2]octyl or 2-(1,7,7-trimethylbicyclo[2.2.1]heptyl radicals.

In one embodiment of the invention, the $R^4$ radicals are $R^{4a}$ and $R^{4b}$ radicals.

In a preferred embodiment, the $R^4$ radicals are $R^{4b}$ radicals, preferably $R^{4b}$ radicals having 4 to 30 carbon atoms, more preferably $R^{4b}$ radicals having 4 to 17 carbon atoms.

In a further preferred embodiment, the $R^4$ radicals are $R^{4c}$ radicals, preferably $R^{4c}$ radicals having 6 to 10 carbon atoms.

It will be appreciated that it is also possible to use a mixture of various alkyl (meth)acrylates (A1b).

Further Monomers (A)

As well as the monomers (A1), it is optionally also possible to use further monoethylenically unsaturated monomers (A2) other than the monomers (A1), i.e. the monomers (A1a) and (A1b). With the aid of further monomers (A) as well as the alkyl (meth)acrylates (A1), it is possible to modify the properties of the inventive polymeric compositions and match them to the desired properties. The person skilled in the art makes a suitable selection.

Further monomers (A2) may especially be (meth)acrylates which comprise hydrocarbyl radicals and do not correspond to the above definition of the monomers (A1a) and (A1b).

These include especially (meth)acrylates (A2a) of the general formula $H_2C=CHR^2-COOR^6$ where $R^2$ is as defined above and $R^5$ is an unsubstituted or alkyl-substituted aromatic hydrocarbyl radical having 6 to 30, preferably 6 to 18, carbon atoms. Examples of aromatic hydrocarbyl radicals $R^5$ comprise phenyl, 4-methylphenyl, benzyl or 2-phenylethyl radicals.

Further monomers (A2) may also be (meth)acrylates of the general formula $H_2C=C(R^2)-COOR^6$ (A2b) where $R^2$ is H or methyl and $R^6$ is a linear or branched, aliphatic and/or aromatic hydrocarbyl radical 1 to 60, preferably 2 to 30, carbon atoms, which radical may be substituted by OH groups and/or in which nonadjacent carbon atoms may be replaced by oxygen atoms. In other words, $R^3$ radicals may thus comprise OH groups and/or ether groups —O—. Examples of (meth)acrylates (A2b) comprise hydroxyethyl (meth)acrylate, hydroxypropyl (meth)acrylate, phenoxyethyl acrylate, or polypropylene glycol mono(meth)acrylate.

Further monomers (A2) may also be (meth)acrylates of the general formula $H_2C=C(R^2)-COOR^7$ (A2c) where $R^2$ is H or methyl and $R^7$ is unsubstituted or alkyl-substituted saturated cyclic aliphatic hydrocarbyl radicals having 5 to 30, preferably 6 to 17, carbon atoms. An example of an $R^7$ radical is a cyclohexyl radical.

Further monomers (A2) may also be vinyl esters of the general formula $H_2C=CH-O-(O)C-R^7$ (A2d) where $R^7$ is a linear or branched alkyl radical having 1 to 60 carbon atoms, preferably 2 to 30 carbon atoms. Examples of $R^7$ radicals comprise methyl, ethyl, n-propyl or n-butyl radicals.

Amounts of the Monomers (A)

According to the invention, 50 to 99 mol % of the monomers (A1) are monomers (A1a) and 1 to 50 mol % of the monomers (A1) are monomers (A1b), with the proviso that the sum of (A1a) and (A1b) adds up to 100 mol %. In other words, the monomers (A1) are thus exclusively a mixture of monomers (A1a) and (A1b). Preference is given to using 50 to 90 mol % of monomers (A1a) and 10 to 50 mol % of monomers (A1b), particular preference to using 70 to 90 mol % of monomers (A1a) and 10 to 30 mol % of monomers (A1b).

When cyclic alkyl radicals $R^{4c}$ are used, it has been found to be particularly useful to use 50 to 80 mol % of monomers (A1a) and 20 to 50 mol % of monomers (A1b), preferably 55 to 75 mol % of monomers (A1a) and 25 to 45 mol % of monomers (A1b).

According to the invention, the amount of the alkyl (meth)acrylates (A1) is at least 70% by weight, preferably at least 80% by weight, more preferably at least 95% by weight, based on the total amount of all monomers (A). The monomers (A) are most preferably exclusively alkyl (meth)acrylates (A1).

Ethylene-Vinyl Ester Copolymers (B)

The ethylene-vinyl ester copolymers (B) used comprise ethylene and vinyl esters of the general formula $H_2C=CH-O-(O)C-R^1$. In this formula, $R^1$ is H or a $C_1$- to $C_4$-hydrocarbyl radical, for example a methyl, ethyl, n-propyl or n-butyl radical. $R^1$ is preferably H, methyl or ethyl and more preferably methyl.

As well as ethylene and the vinyl esters, further monomers may optionally also be present. The amount of such further monomers should, however, not exceed 20% by weight, preferably 10% by weight, based on the amount of all monomers, and particular preference is given to the presence of no further monomers aside from ethylene and the vinyl esters.

The amount of ethylene in the ethylene-vinyl ester copolymers (B) is 55 to 85% by weight and the amount of vinyl esters is 15 to 45% by weight based on the amount of all monomers.

Preferably, the amount of ethylene is 55 to 75% by weight and the amount of vinyl esters 25 to 45% by weight, more preferably 30 to 40% by weight, and, most preferably, the amount of ethylene is 60 to 70% by weight and the amount of vinyl esters 30 to 40% by weight.

The weight-average molecular weight $M_w$ of the ethylene-vinyl ester copolymers (B) used is preferably at least 30 000 g/mol, for example 30 000 g/mol to 200 000 g/mol, preferably 50 000 g/mol to 150 000 g/mol.

Polymeric Composition and Production Thereof

The inventive polymeric compositions are obtainable by free-radical polymerization of the monomers (A) in the presence of the ethylene-vinyl ester copolymers (B).

The mixing ratio of monomers (A) and ethylene-vinyl ester copolymers (B) is selected according to the desired properties of the polymeric composition to be synthesized, and the amount of the monomers (A) should be at least 50% by weight based on the sum of monomers (A) and ethylene-vinyl ester copolymers (B). In general, the amount of the monomers (A) is 70 to 90% by weight and that of the ethylene-vinyl ester copolymers (B) 10 to 30% by weight. Preferably, the amount of the monomers (A) is 75 to 85% by weight and that of the ethylene-vinyl ester copolymers (B) 15 to 25% by weight.

Solvents

In a preferred embodiment of the invention, the polymeric composition further comprises suitable solvents. The polymeric composition should be homogeneously dispersed, preferably dissolved, therein. In principle, all solvents which meet these requirements are suitable. It is of course also possible to use mixtures of different solvents.

The concentration of the polymeric composition in the solvents is selected by the person skilled in the art according to the desired properties of the formulation to be produced. In a preferred embodiment of the invention, the concentration is 20 to 80% by weight, preferably 30% by weight to 70% by weight and, for example, 40 to 55% by weight of the polymeric composition based on the sum of all components of the composition including solvents used. The use of a concentrate has the advantage that the transport costs from the site of production to the site of use, for example an oil production installation, can be kept low.

The solvents may, for example, be nonpolar solvents comprising saturated aliphatic hydrocarbyl groups, preferably those having a flashpoint ≥60° C. Examples of such solvents comprise saturated aliphatic hydrocarbons, saturated aliphatic alcohols or esters of saturated aliphatic carboxylic acids and saturated aliphatic alcohols, with the proviso that the solvents each have a flashpoint ≥60° C. Examples of alcohols comprise aliphatic alcohols having at least 8 carbon atoms, such as 1-octanol, 1-decanol or 1-dodecanol. Examples of esters comprise esters of saturated fatty acids having at least 8 carbon atoms with saturated aliphatic alcohols, for example methyl laurate or methyl stearate. Technical mixtures of various aliphatic esters are commercially available. In a further embodiment of the invention, it is possible to use esters of aliphatic or cycloaliphatic dicarboxylic acids, for example dialkyl esters of cyclohexane-1,2-dicarboxylic acid, such as diisononyl cyclohexane-1,2-dicarboxylate.

In a preferred embodiment of the invention, solvents used are hydrocarbons. These may be aliphatic, cycloaliphatic and/or aromatic hydrocarbons. Preference is given to hydrocarbons or hydrocarbon mixtures having a flashpoint ≥60° C.

The hydrocarbons may, for example, be saturated aliphatic solvents or solvent mixtures. These may be either paraffinic or naphthenic, i.e. saturated cyclic, hydrocarbons. Preference is given to high-boiling aliphatic hydrocarbons having a boiling point of at least 175° C. and preferably a flashpoint ≥60° C. Suitable hydrocarbons having a flashpoint ≥60° C. comprise, for example, n-undecane (flashpoint 60° C., boiling point 196° C.) or n-dodecane (flashpoint 71° C., boiling point 216° C.). It is possible with preference to use technical mixtures of hydrocarbons, for example mixtures of paraffinic hydrocarbons, mixtures of paraffinic and naphthenic hydrocarbons or mixtures of isoparaffins. It will be apparent to those skilled in the art that technical mixtures may still comprise small residues of aromatic or unsaturated hydrocarbons. The content of aromatic and/or unsaturated hydrocarbons should, however, be generally <1% by weight, preferably <0.5% by weight and more preferably <0.1% by weight. Technical mixtures of saturated aliphatic solvents are commercially available, for example technical mixtures of the Shellsol® D series or the Exxsol® D series.

The hydrocarbons may also be aromatic solvents or solvent mixtures. In one embodiment of the invention, the hydrocarbons are toluene or a solvent mixture comprising toluene. In a further embodiment, the hydrocarbons are high-boiling aromatic hydrocarbons having a boiling point of at least 175° C. and preferably a flashpoint ≥60° C. Suitable aromatic hydrocarbons having a flashpoint ≥60° C. comprise, for example, naphthalene. It is possible with preference to use technical mixtures of aromatic hydrocarbons. Technical mixtures of aromatic solvents are commercially available, for example technical mixtures of the Shellsol® A series or the Solvesso® series.

It is particularly advantageously possible to use mixtures of aliphatic hydrocarbons having a flashpoint ≥60° C. and aromatic hydrocarbons having a flashpoint ≥60° C.

Free-Radical Polymerization

The performance of such free-radical polymerizations is known in principle to those skilled in the art. The free-radical polymerization can in principle be performed by means of a bulk polymerization, by polymerizing the monomers (A) in the presence of the ethylene-vinyl ester copolymers (B) and of an initiator for free-radical polymerization and in the absence of solvents. Details of this are described in EP 486 836 A1, page 4 lines 38 to 46.

In a preferred embodiment of the invention, the preparation is undertaken by means of a solution polymerization. Suitable solvents for this purpose are in principle all of those in which the monomers (A), the ethylene-vinyl acetate copolymers (B) and the polymeric composition formed—even in the high concentration desired—have sufficient solubility or are at least homogeneously dispersed and which do not enter into any unwanted reactions in the course of the polymerization. More particularly, they should not themselves be polymerizable and not have any excessive regulating action.

The solvents are preferably hydrocarbons, preferably the above-described aliphatic and/or aromatic hydrocarbons, especially those having a flashpoint ≥60° C. Advantageously, in the case of such a procedure, a ready-to-use solvent-comprising polymeric composition which can be used as a pour point depressant is obtained, without any requirement for further workup steps after the polymerization.

For the polymerization in solution, a solution of the alkyl (meth)acrylates (A1a), the alkyl (meth)acrylates (A1b), optionally further monomers (A) and the copolymers (B) is first provided in the selected solvent, preferably in hydrocarbons. The solvent may, for example, be toluene.

The dissolution is effected by vigorous mixing of the components, for example by stirring. For example, it is possible first to dissolve the monomers (A) and then to add solid ethylene-vinyl ester copolymer (B) to the solution, or first to dissolve ethylene-vinyl ester copolymers (B) and to add the monomers (A). The dissolution can be accelerated by increasing the temperature, for example to about 50 to 80° C. In one variant of the invention, a solution of the alkyl (meth)acrylates (A1a) in hydrocarbons, preferably aliphatic hydrocarbons having a flashpoint ≥60° C. can be provided, by esterifying (meth)acrylic acid with alcohols $R^3OH$ in hydrocarbons and using the resulting solution, after mixing with the further components, for polymerization. The esterification can be performed by methods known in principle to those skilled in the art, for example by the processes described by EP 486 836 A1.

The free-radical polymerization is effected using thermal initiators for free-radical polymerization. Naturally, the initiators used are selected such that they are soluble in the polymerization medium. Preferred polymerization initiators comprise oil-soluble azo compounds, especially those having a 10 h half-life of 50° C. to 70° C. Examples of suitable initiators comprise dimethyl 2,2'-azobis(2-methylpropionate) (10 h half-life approx. 66° C.), 2,2'-azobis(2-methylbutyronitrile) (10 h half-life approx. 67° C. or 2,2'-azobis(2,4-dimethylvaleronitrile) (10 h half-life approx. 51° C.). Such initiators are commercially available (from Wako). The weight ratio of monomers A to the initiators is generally about 100:1 to 150:1, preferably 125:1 to 140:1. It is possible for the entire amount of the initiators to be present at the start of the polymerization, but preference is given to adding the initiator gradually. The addition may be in portions or continuous, preferably continuous.

In addition, molecular weight regulators can be added in a manner known in principle. Examples of regulators comprise alcohols such as isopropanol, allyl alcohol or buten-2-ol, thiols such as ethanethiol, or aldehydes such as crotonaldehyde. The amount of the molecular weight regulators is generally 1 to 4% by weight based on the monomers (A), preferably 2 to 3% by weight based on the monomers (A).

The free-radical polymerization is triggered in a manner known in principle by heating the reaction mixture. The polymerization temperature should be above the 10 h half-life of the initiator and is generally at least 50° C. A useful polymerization temperature has been found to be from 50 to 90° C. In general, the polymerization is undertaken in a manner known in principle under a protective gas such as nitrogen or argon.

The polymerization in solution can be undertaken by initially charging the solution of the starting materials in a suitable, typically stirred, reaction vessel, appropriately with preceding performance of the dissolution in the apparatus. The concentration of the monomers (A) in the solvents is selected by the person skilled in the art according to the desired properties of the mixture to be produced. In a preferred embodiment of the invention, the concentration is 40 to 80% by weight, for example 45% by weight to 55% by weight. If desired, one or more molecular weight regulators are added to the solution. After the desired polymerization temperature has been attained, a solution of the polymerization initiator is added gradually to the mixture to be polymerized. The duration of addition may be 0.5 h to 10 h, without any intention to restrict the invention to this range. The completion of addition of the initiator should generally be followed by a further polymerization time. This may, for example, be 0.5 to 5 h. A solution of the inventive polymer mixture is obtained.

By means of the production process described, it is possible to obtain a polymeric composition, preferably a polymeric composition in solvents, preferably hydrocarbons. The polymerization of the monomers (A) in the presence of the ethylene-vinyl ester copolymers (B) prevents the polymer components from separating from one another in solution. The result of the polymerization reaction is different when the monomers (A)—under otherwise identical conditions—are polymerized separately from the ethylene-vinyl ester copolymers (B) and solutions of a polymer formed from the monomers (A) and a solution of the ethylene-vinyl ester copolymers (B) are combined after the polymerization. Such mixtures can separate again.

Although we do not wish to be bound to a particular theory, this effect can be explained by at least partial grafting of the monomers (A) onto the ethylene-vinyl ester copolymer (B) in the course of polymerization. A further portion of the monomers may polymerize without being grafted on. This gives rise to ethylene-vinyl ester graft copolymers with side groups comprising monomers (A), and homo- or copolymers comprising monomers (A). In a manner known in principle, the partial grafting prevents separation of the two polymer components. It is also possible that no significant grafting occurs, but that an "interjacent complex" forms from the ethylene-vinyl ester copolymers (B) and the homo- or copolymers of monomers (A). In such a complex, the polymers are predominantly physically bound and nevertheless stable, as described, for example, in U.S. Pat. No. 7,001,903 B2.

Use of the Formulations as Pour Point Depressants

The resulting polymeric compositions, especially polymeric compositions in hydrocarbons, preferably those having a flashpoint ≥60° C., can be used in accordance with the invention as pour point depressants for crude oil, mineral oil and/or mineral oil products, by adding at least one of the polymer formulations detailed to the crude oil, mineral oil and/or mineral oil products. In addition, it is of course also possible to use further formulations which act as pour point depressants.

Pour point depressants reduce the pour point of crude oils, mineral oils and/or mineral oil products. The pour point ("yield point") refers to the lowest temperature at which a sample of an oil, in the course of cooling, still just flows. For the measurement of the pour point, standardized test methods are used.

For the inventive use, the polymeric composition can be used as such.

Preference is given, however, to using formulations of the polymeric compositions in suitable solvents which may comprise further components as well as the solvents.

It is possible to use a concentrate, for example a concentrate having a total polymer content of 50% by weight to 80% by weight in solvents. Such a concentrate can be produced by means of the abovementioned process. However, it is also possible to dilute with further solvent, preferably to formulate with aliphatic and/or aromatic hydrocarbons and/or with further components.

For example, additional wax dispersants can be added to the formulation. Wax dispersants stabilize paraffin crystals which have formed and prevent them from sedimenting. The wax dispersants used may, for example, be alkylphenols, alkylphenol-formaldehyde resins or dodecylbenzenesulfonic acid. The concentration of a usable formulation may, for example, be 20 to 50% by weight, preferably 25 to 40% by weight, of polymers prepared in accordance with the invention and optionally further components except for the solvents, this figure being based on the total amount of all components including the solvents. While the formulations are naturally produced in a chemical plant, the ready-to-use formulation can advantageously be produced on site, i.e., for example, directly at a production site for oil.

The inventive use is effected by adding the inventive polymeric compositions or the formulations comprising polymeric compositions to the crude oil, mineral oil and/or mineral oil products, preferably to the crude oil.

It is the advantage of the inventive polymeric compositions which are produced using a combination of at least one alkyl (meth)acrylate (A1a) and at least one alkyl (meth)acrylate (A1b) that the solutions thereof in hydrocarbons are still liquid, even at room temperature, at a concentration of about 45% by weight to 70% by weight. Such concentrates can be used without any requirement for melting of the concentrates prior to use. This makes it quite considerably easier to work with the products.

The formulations are typically used in such an amount that the amount of the polymeric composition added is 50 to 1500 ppm based on the oil. The amount is preferably 100 to 1000 ppm, more preferably 250 to 600 ppm and, for example, 300 to 600 ppm. The amounts are based on the polymeric composition itself, not including any solvents present and optional further components of the formulation.

In a preferred embodiment of the invention, the oil is crude oil and the formulation is injected into a crude oil pipeline. The injection can preferably be effected at the oilfield, i.e. at the start of the crude oil pipeline, but the injection can of course also be effected at another site. More particularly, the pipeline may be one leading onshore from an offshore platform. Explosion protection is particularly important on offshore platforms and in refineries, and the inventive formulations based on solvents having a flashpoint ≥60° C. accordingly simplify working quite considerably. Moreover, the cooling of crude oil in underwater pipelines leading onshore from an offshore platform is naturally particularly rapid, especially when the pipelines are in cold water, for example having a water temperature of less than 10° C.

In a further embodiment of the invention, the oil is crude oil and the formulation is injected into a production well. Here too, the production well may especially be a production well leading to an offshore platform. The injection is preferably effected approximately at the site where oil from the formation flows into the production well. In this way, the solidification of the crude oil in the production well or an excessive increase in its viscosity can be prevented.

Further Uses of the Formulations

The inventive polymeric composition can of course also be used for other purposes.

In a further embodiment of the invention, the above-detailed polymeric compositions, especially formulations in solvents, especially hydrocarbons, are used to prevent wax deposits on surfaces in contact with crude oil, mineral oil and/or mineral oil products. The use is effected by adding at least one of the above-detailed polymer formulations to the crude oil, mineral oil and/or mineral oil products. Preferred formulations have already been mentioned, and the manner of use is also analogous to the use as a pour point depressant. As well as the inventive formulations, it is of course also possible to use further formulations which act as wax inhibitors.

The following examples are intended to illustrate the invention in detail:

A Production of the Polymer Mixtures
Starting Materials Used:

| | |
|---|---|
| ethylene-vinyl acetate copolymer | ethylene-vinyl acetate copolymer formed from 67% by weight of ethylene and 33% by weight of vinyl acetate, melt flow index 21 g/10 min (measured to ASTM D 1238), $M_n$ approx. 34 000 g/mol, $M_w$ approx. 134 000 g/mol. |
| Wako V-601 | dimethyl 2,2'-azoisobutyrate, 10 h half-life approx. 66° C. (in toluene) |
| behenyl acrylate | technical mixture of $C_{18}$, $C_{20}$ and $C_{22}$ acrylates with a linear alkyl radical, 40 to 55% by weight of $C_{18}$ acrylate, max. 15% by weight of $C_{20}$ acrylate and 35 to 45% by weight of $C_{22}$ acrylate |
| butyl acrylate | |
| t-butyl acrylate | |
| 2-propylheptyl acrylate | |
| 2-propylheptyl methacrylate | |
| cyclohexyl methacrylate | |
| i-tridecyl acrylate | acrylate with a branched tridecyl radical; the radical has an average of about 3 branches. |
| i-heptadecyl acrylate | acrylate with a branched heptadecyl radical; the radical has an average of about 3 branches. |
| i-nonyl acrylate | acrylate with a nonyl radical; the remainder is a mixture of various isomers |
| 2-hydroxyethyl acrylate | |
| hydroxypropyl acrylate | |
| polypropylene glycol monoacrylate | acrylate with polypropylene radical having an average of 6 propylene oxide units |
| $C_{16/18}$-O-(EO)$_{11}$ methacrylate | methacrylate formed from a $C_{16/18}$ fatty alcohol (mixture of n-hexadecanol (approx. 30%) and n-octadecanol (approx. 70%) alkoxylated with an average of 11 ethylene oxide units. |
| phenoxyethyl acrylate | $H_2C=CH-COO-CH_2-CH_2O-C_6H_5$ |
| isobornyl acrylate | 2-(1,7,7-trimethylbicyclo[2.2.1]heptyl)acrylate |

Experimental Method for Example 3 in Table 1:
Copolymer of 80:20 (Wt/Wt) Behenyl Acrylate/2-Propylheptyl Acrylate In a four-neck flask with Teflon stirrer, jacketed coil condenser and Dosimat, 216.8 g of behenyl acrylate and 54.2 g of propylheptyl acrylate are dissolved in 217 g of toluene at 75° C., then 66.4 g of the abovementioned ethylene-vinyl acetate copolymer are added while stirring and dissolved. At 78-80° C., 8.2 g of allyl alcohol in 3.2 g of toluene, then 1.15 g of the dimethyl 2,2'-azoisobutyrate initiator (Wako V-601) dissolved in 31.4 g of toluene are metered in over the course of 4 hours. After further polymerization at 82° C. for 2.5 hours, the mixture is diluted with 106.3 g of toluene and cooled to 40° C., before 0.42 g of triethanolamine is added. After stirring for a further 30 min, the mixture is filtered through a 280 μm fast sieve.

The resulting solution had a concentration of 48% by weight of the polymeric composition.

Further examples and the comparative examples were performed by the same method, except that the type of 2nd acrylate and the ratio of behenyl acrylate to the 2nd acrylate was altered. The selected monomers and ratios are each compiled in table 1. The resulting concentration of the polymeric composition in all experiments was 48% by weight.

B Test of the Properties of the Polymeric Compositions Obtained

The solutions of the copolymers obtained were used to conduct each of the following tests:

Determination of the K Values of the Copolymers

The K values of the copolymers obtained (measured according to H. Fikentscher, Cellulosechemie, volume 13, pages 58 to 64 and 71 to 74 (1932)) were determined in 2% (wt./vol.) toluenic solution. The values are compiled in table 1.

Molecular Weight Determination

The number-average molecular weight $M_n$ and the weight-average molecular weight $M_w$ of each of the copolymers obtained were determined by means of gel permeation chromatography in tetrahydrofuran as the solvent. The values are compiled in table 1.

Determination of Viscosity:

The kinematic viscosity of each of the solutions of the graft copolymers obtained in the experiments described above was measured with an Ubbelohde viscometer at 50° C. The values are compiled in table 1.

Assessment of Stability

The stability of each polymer solution was determined, specifically with respect to whether a solution which has prolonged stability and does not have a tendency to phase separation is maintained. For this purpose, the formulations produced, after synthesis, were stored at room temperature. If noticeable phase separation occurs within 24 h after commencement of storage, the assessment is negative (−), otherwise (+). The values are compiled in table 1.

Determination of the Pour Point

The determination of the pour point was conducted to ASTM D 5853 "Test Method for Pour Point of Crude Oils". The pour point is the minimum temperature at which a sample of a tested oil is still just free-flowing. According to ASTM D 5853, for this purpose, a sample of the oil is cooled in steps of 3° C. each and the flowability is tested after each step. For the tests, a crude oil from the "Landau" oilfield in south-west Germany (Wintershall Holding GmbH) having an API gravity of 37 and a pour point of 27° C. was used. To determine the lowering of the pour point, the graft copolymers to be tested were used to the oil in a concentration of 100 ppm, 300 ppm or 1500 ppm, in each case of polymer based on the crude oil. The values are compiled in table 1. Double or triple determinations were conducted on some samples. In these cases, all measurements are reported in the table.

TABLE 1

Results of the examples and comparative examples

| No. | 2nd acrylate | behenyl acrylate/ 2nd acrylate Mass ratio | behenyl acrylate/ 2nd acrylate Molar ratio | Viscosity at 50° C. [mm²/s] | Stability at RT | $M_n$ $M_w$ [g/mol] | K value | Pour point [° C.] Amount of the additives 100 ppm | 300 ppm | 1500 ppm |
|---|---|---|---|---|---|---|---|---|---|---|
| C1 | — | 100/0 | 100/0 | 179 | + solid | 2230 57000 | | 6/6/9 | 3/0/3 | 9/6/6 |
| 5 | n-butyl acrylate | 90/10 | 77/23 | 269 | + liquid | 7330 10600 | 41.3 | 6/9/12 | 6/6/6 | 9/0/9 |
| 6 | n-butyl acrylate | 80/20 | 60/40 | 315 | + liquid | 8290 132000 | 43.3 | 12/12 | 9/6/3 | 9/6/9 |
| 7 | tert-butyl acrylate | 90/10 | 77/23 | 258 | + liquid | 7110 102000 | 40.2 | 12/12/12 | 6/3/9/6 | 12/12/9 |
| 8 | tert-butyl acrylate | 85/15 | 67/33 | 296 | liquid | 6930 107800 | 42.8 | 6/9 | 6/6 | 9/6 |
| 9 | tert-butyl acrylate | 80/20 | 60/40 | 324 | + liquid | 8280 130000 | 43.2 | 6/6/−3 | 3/0/9 | 0/6/0 |
| 10 | tert-butyl acrylate | 75/25 | 52/48 | 341 | + liquid | 7920 123700 | 44.8 | 6/9 | 9/9 | 3/3 |
| C3 | tert-butyl acrylate | 50/50 | 27/73 | 218 | + liquid | 14640 219800 | 47.2 | 27/24 | 27/27 | 24/24 |
| 1 | 2-propylheptyl acrylate | 90/10 | 85/15 | + 163 | + liquid | 4170 65300 | 36.7 | 6/6/9 | 6/0/6 | 0/9/6 |
| 2 | 2-propylheptyl acrylate | 85/15 | 77/23 | + 296 | + liquid | 6100 110800 | 42.4 | 9/9 | 6/6 | 6/6 |
| 3 | 2-propylheptyl acrylate | 80/20 | 71/29 | + 227 | + liquid | 9700 95800 | 39.2 | 6/6 | 6/3/3 | 6/3/−3 |
| 4 | 2-propylheptyl acrylate | 75/25 | 64/36 | + 223 | + liquid | 7500 79800 | 39.4 | 3/6 | 3/3 | 6/6 |
| C2 | 2-propylheptyl acrylate | 50/50 | 38/62 | + 211 | + liquid | 10900 90900 | 38.8 | 12/9/9 | 12/9/9 | 6/6 |
| 11 | 2-propylheptyl methacrylate | 90/10 | 85/14 | 227 | − gelated | 5590 87700 | 40 | 9/9 | 9/9 | 12/6 |
| 12 | 2-propylheptyl methacrylate | 80/20 | 72/28 | 283 | + liquid | 6030 104000 | 40.8 | 9/6 | 6/6 | 6/6 |
| 13 | i-nonanol acrylate | 90/10 | 84/16 | 232 | + liquid | 6290 88030 | 39.2 | 6/9 | 0/3 | 9/9 |
| 14 | i-nonanol acrylate | 80/20 | 71/29 | 237 | + liquid | 6740 92000 | 39.6 | 6/9 | 3/3 | 9/9 |
| 15 | i-tridecyl acrylate | 90/10 | 87/13 | 222 | + liquid | 5640 81600 | 38.2 | 9/9 | 6/6 | 9/9 |
| 16 | i-tridecyl acrylate | 80/20 | 75/25 | 220 | + liquid | 6940 83000 | 39.0 | 9/9 | 9/9 | 15/18 |
| 17 | i-heptadecyl acrylate | 90/10 | 89/11 | 197 | + liquid | 4980 78300 | 39.7 | 6/9 | 3/6 | 6/6 |
| 18 | i-heptadecyl acrylate | 80/20 | 78/22 | 302 | + liquid | 5450 89390 | 40.3 | 9/9 | 6/6 | 6/6 |
| 19 | cyclohexyl methacrylate | 75/25 | 59/41 | 743 | + liquid | 9490 199000 | 47.3 | 3/3 | −3/−3 | 0/0 |
| 20 | isobornyl acrylate | 80/20 | 70/30 | 244 | + liquid | 7350 80100 | 38 | 9/9 | 6/6 | 9/12 |
| C4 | 2-hydroxyethyl acrylate | 90/10 | 75/25 | 237 | − solid | 7270 98200 | 39.5 | 18/12 | 12/12 | 12/9 |
| C5 | 2-hydroxyethyl acrylate | 80/20 | 57/43 | 470 | − solid | 7890 79400 | 37.5 | 12/12 | 6/12 | 12/15 |
| C6 | hydroxypropyl acrylate | 90/10 | 79/21 | 212 | − solid | 6320 92800 | 40.3 | 9/12 | 6/6 | 6/12 |
| C7 | polypropylene glycol monoacrylate | 90/10 | 92/8 | 245 | − solid | 5460 95760 | 39.5 | 9/9 | 6/6 | 9/9 |
| C8 | polypropylene glycol monoacrylate | 80/20 | 83/17 | 397 | − solid | 6770 174500 | 40.5 | 6/6 | 6/6 | 9/6 |

TABLE 1-continued

Results of the examples and comparative examples

| | | behenyl acrylate/ 2nd acrylate | | Viscosity at | | $M_n$ | | Pour point [° C.] Amount of the additives | | |
|---|---|---|---|---|---|---|---|---|---|---|
| No. | 2nd acrylate | Mass ratio | Molar ratio | 50° C. [mm²/s] | Stability at RT | $M_w$ [g/mol] | K value | 100 ppm | 300 ppm | 1500 ppm |
| C9 | $C_{16/18}$—O—$(EO)_{11}$ methacrylate | 90/10 | 95/5 | 205 | – solid | 7055 107800 | 37.7 | 12/12 | 6/6 | 9/9 |
| C10 | $C_{16/18}$—O—$(EO)_{11}$ methacrylate | 80/20 | 90/10 | 212 | – viscous | 7225 180100 | 37.8 | 12/12 | 6/9 | 3/0 |
| C11 | phenoxyethyl acrylate | 90/10 | 83/17 | 274 | – solid | 8350 92500 | 40.1 | 9/9 | 3/3 | 6/9 |

The examples and comparative examples show that, with use of further alkyl (meth)acrylates (A1b) as well as behenyl acrylate, it is possible to obtain polymeric compositions which are still liquid in toluenic solution even as concentrates (48% by weight of polymeric composition). The polymer mixture comprising only behenyl acrylate is solid in toluenic solution under the same conditions.

However, not all alkyl (meth)acrylates are equally effective. Alkyl (meth)acrylates having branched alkyl radicals or those having relatively short, linear alkyl radicals are effective.

The use of acrylates comprising OH groups or ether groups leads not to liquid products but to solid products. Equally, in the case of proportions of more than 50 mol % of the monomers (A1b), the performance properties of the polymer mixtures as pour point depressants deteriorate quite considerably. A polymeric composition comprising 73 mol % of t-butyl acrylate is liquid but is completely ineffective as a pour point depressant.

A quite excellent effect as a pour point depressant was obtained in experiment 19. The polymer was prepared using a monomer mixture of 75% by weight of behenyl acrylate and 25% by weight of cyclohexyl methacrylate.

The invention claimed is:

1. A process for lowering the pour point of a crude oil, the process comprising adding a polymer composition to the crude oil, the polymer composition comprises a copolymer obtained by free-radical polymerization of monoethylenically unsaturated monomers (A) in the presence of at least one ethylene-vinyl ester copolymer (B), wherein
the unsaturated monomers (A) comprise at least 70% by weight of alkyl (meth)acrylates (A1) based on a total amount of monomers (A),
the ethylene-vinyl ester copolymers (B) comprise 55 to 85% by weight of ethylene and 15 to 45% by weight of vinyl esters of formula (III) H₂C═CH—O—(O)C—R¹, where R¹ is H or a
C₁-C₄ hydrocarbyl radical, and
the amount of the monomers (A) accounts for 70 to 90% by weight, and the amount of the ethylene-vinyl ester copolymers (B) accounts for 10 to 30% by weight, based on the total weight of the monomers (A) and the copolymers (B), of the polymer composition,
wherein the alkyl (meth)acrylates (A1) consist of a mixture of
(A1a) 50 to 99 mol % of at least one alkyl (meth)acrylate of formula
H₂C═C(R²)—COOR³, where R² is H or a methyl group, and R³ is a linear alkyl radical having 16 to 30 carbon atoms, and
(A1b) 1 to 49 mol % of at least one alkyl (meth)acrylate of formula H₂C═C(R²)—COOR⁴, where R² is as defined above, and R⁴ is a hydrocarbyl radical selected from $R^{4a}$, $R^{4b}$ or $R^{4c}$ radicals each of which is defined as follows:
$R^{4a}$ is a linear alkyl radicals having 1 to 11 carbon atoms,
$R^{4b}$ is a branched alkyl radicals having 4 to 60 carbon atoms, and
$R^{4c}$ is a cyclic alkyl radicals having 5 to 20 carbon atoms
and wherein the polymeric composition further comprises a hydrocarbon solvent and wherein the concentration of the copolymer is present in an amount from 40 to 55% by weight of the polymeric composition.

2. The process according to claim 1, wherein $R^4$ is $R^{4b}$.

3. The process according claim 2 wherein $R^{4b}$ is a branched alkyl radical having 4 to 17 carbon atoms.

4. The process according to claim 1, wherein R³ is a linear alkyl radical having 18 to 24 carbon atoms.

5. The process according to claim 1, wherein $R^{4a}$ is a linear alkyl radical having 2 to 6 carbon atoms; $R^{4b}$ is a branched alkyl radical having 4 to 30 carbon atoms; and $R^{4c}$ is a cyclic alkyl radical having 6 to 10 carbon atoms.

6. The process according to claim 1, wherein the hydrocarbons solvent has a flashpoint ≥60° C.

7. The process according to claim 6, wherein the solvent comprises saturated aliphatic hydrocarbons, aromatic hydrocarbons, saturated aliphatic alcohols or esters of saturated aliphatic carboxylic acids and saturated aliphatic alcohols.

8. The process according to claim 6, wherein the solvent is selected from the group consisting of 1-octanol, 1-decanol, 1-dodecanol, methyl laurate, methyl stearate, undecane, n-dodecane, and diisononyl cyclohexane-1,2-dicarboxylate.

9. The process according to claim 6, wherein the solvent is selected from mixtures of paraffinic hydrocarbons, mixtures of naphthenic hydrocarbons, mixtures of isoparaffins or any one mixture thereof.

10. The process according to claim 1, wherein the polymer composition further comprises at least one wax dispersant.

11. The process according to claim 1, wherein the adding of the polymer composition to the crude oil provides a concentration of the polymer composition in the crude oil of from 50 to 1500 ppm.

12. The process according to claim 11, wherein the polymer composition is added to the crude oil, and the crude oil is in a pipeline or a production well.

13. The process according to claim 11, wherein the adding of the polymer composition to the crude oil provides a concentration of the polymer composition in the crude oil of from 250 to 600 ppm.

14. The process according to claim 1, wherein the ethylene-vinyl ester copolymers (B) comprise 60 to 75% by weight of ethylene and 25 to 40% by weight of vinyl esters.

15. The process according to claim 1, wherein the amount of the monomers (A) accounts for 75 to 85% by weight, and the amount of the ethylene-vinyl ester copolymers (B) accounts for 25 to 15% by weight, based on the total weight of the monomers (A) and the copolymers (B), of the polymer composition.

16. The process according to claim 1, wherein the alkyl (meth)acrylates (A1a) is a technical mixture of $C_{18}$, $C_{20}$ and $C_{22}$ acrylates with a linear alkyl radical, and includes 40 to 55% by weight of $C_{18}$ acrylate, up to 15% by weight of $C_{20}$ acrylate, and 35 to 45% by weight of $C_{22}$ acrylate.

17. The process according to claim 1, wherein the alkyl (meth)acrylates (A1b) is selected from 2-propylheptyl (meth)acrylate, cyclohexyl (meth)acrylate, tert-butyl (meth)acrylate, an acrylate with a branched tridecyl radical, the radical having an average of about 3 branches, an acrylate with a branched heptadecyl radical, the radical having an average of about 3 branches, or an acrylate with a nonyl radical.

18. The process according to claim 1, wherein $R^3$ is a linear alkyl radical having 18 to 22 carbon atoms.

19. The process according to claim 1, wherein
$R^{4a}$ is a linear alkyl radicals having 2 to 10 carbon atoms,
$R^{4b}$ is a branched alkyl radicals having 3 to 30 carbon atoms, and
$R^{4c}$ is a cyclic alkyl radicals having 6 to 12 carbon atoms.

20. The process according to claim 1, wherein
$R^{4a}$ is a linear alkyl radicals having 2 to 6 carbon atoms,
$R^{4b}$ is a branched alkyl radicals having 4 to 17 carbon atoms, and
$R^{4c}$ is a cyclic alkyl radicals having 6 to 10 carbon atoms.

* * * * *